United States Patent [19]
Roumeau

[11] Patent Number: 5,706,719
[45] Date of Patent: Jan. 13, 1998

[54] CHEESE MOULDING DEVICE

[75] Inventor: Alain Roumeau, Doeuil sur Mignon, France

[73] Assignee: Equipements Techniques des Industries Alimentaires et Connexes Tecnal, Niort, France

[21] Appl. No.: 545,713

[22] PCT Filed: May 4, 1994

[86] PCT No.: PCT/FR94/00519

§ 371 Date: Nov. 7, 1996

§ 102(e) Date: Nov. 7, 1996

[87] PCT Pub. No.: WO94/26095

PCT Pub. Date: Nov. 24, 1994

[30] Foreign Application Priority Data

May 7, 1993 [FR] France ................. 93 05521

[51] Int. Cl.⁶ ............................................ A01J 25/13
[52] U.S. Cl. ................. 99/452; 99/456; 99/461; 99/466; 426/512; 426/582
[58] Field of Search .................... 426/36, 582, 512; 99/452, 456, 461, 466

[56] References Cited

U.S. PATENT DOCUMENTS

| | | | |
|---|---|---|---|
| 2,917,827 | 12/1959 | Lankford | 99/348 |
| 3,802,332 | 4/1974 | Fassenbender et al. | 426/36 X |
| 3,824,918 | 7/1974 | Bronkhorst | 99/452 |
| 4,568,554 | 2/1986 | Derode | 426/582 |
| 4,676,475 | 6/1987 | Grandin et al. | 249/105 |
| 4,750,415 | 6/1988 | Osterman | 99/456 X |
| 5,384,137 | 1/1995 | Bolioli et al. | 426/582 X |

FOREIGN PATENT DOCUMENTS

| | | | |
|---|---|---|---|
| 1453759 | 8/1966 | France . | |
| 2426406 | 1/1980 | France | 99/456 |
| 2 595 199 | 9/1987 | France . | |
| 2 613 583 | 10/1988 | France . | |
| 37 37 280 | 6/1988 | Germany . | |
| 3811522 | 10/1988 | Germany | 99/456 |
| 2065487 | 7/1981 | United Kingdom . | |

*Primary Examiner*—Milton Cano
*Attorney, Agent, or Firm*—Young & Thompson

[57] ABSTRACT

A device for moulding cheese includes a vessel (1), for containing a mixture of curds and serum, and a series of moulding cups (11), a distribution trough (3) into which mixture from the vessel (1) flows, and a hopper (5) including a row of openings (16) located above the series of moulding cups (11), and disposed at the distribution trough (3) outlet. A mechanism moves the hopper (5) and the series of moulding cups (11) in a horizontal direction relative to each other.

4 Claims, 2 Drawing Sheets

CHEESE MOULDING DEVICE

The present invention relates to a cheese moulding method and a device for application of such method according to the invention.

The production of cheese generally consists in obtaining a mixture of curds and serum from milk, and introduce it into moulds which it will drain in.

Yet, curds and serum are very often introduced moulds manually and empirically.

When serum-curds mixture is introduced into a distributor located above the moulds positioned side by side, a scraper is manually rubbed inside the distributor so as to tip the curds-serum mixture into the moulds.

However, it is difficult to obtain cheeses having the same weight, since the serum/curds ratio by weight is very different from one production to the other and during moulding, depending on the serum drained out of the mould.

The automation of this technique does meet many problems such as uncertainty about the volume/weight ratio of the moulded mixture, account being taken of the important variations from one production to the other, as regards the dry matter content in the curds and serum mixture.

The object of the present invention is to make the automatic moulding of cheese possible, while guaranteeing a certain consistency in the production of cheeses, more particularly as far as their weight is concerned.

The cheese moulding method concerned by the invention makes it possible to mould a mixture of curds and serum in a series of moulding cups.

According to the invention, this method comprises the following steps:

a) pouring of the curds and serum mixture into a distribution trough;

b) filling, with said mixture, of a hopper including a row of openings located above the series of cups; and c) moving of the hopper and the series of cups one relatively to the other so as to fill the moulding cups.

Thus, the curds and serum mixture introduced into the hopper is tipped into the cups through the hopper openings. The relative motion of the hopper and the series of cups makes it possible to have a continuous filling of the moulding cups.

According to a preferred embodiment of the invention, during step c), the hopper is steady and the series of cups is subject to a reciprocating motion under the hopper.

Thus, the filling of the moulding cups is carried out in several operations, which makes it possible for the serum-curds mixture to be properly distributed into the cups, between each passage under the hopper.

Preferably, the method according to the invention includes a step d) during which the volume of cups increases between each reciprocating motion of step c).

Between each passage of the hopper above the cups, the volume thereof is increased by a predetermined value.

The mixture is thus loaded into the cups in several operations which makes it possible to increase the homogeneity of the curds-serum mixture between the various cups.

According to a profitable version of the invention, upon completion of step c), the value of the quantity of the serum-curds mixture contained in the hopper is compared to a set value, and the comparative value thus obtained is used for adjusting the value of the volume reached by the cups upon completion of step c) for the next application of the method.

Such comparative value thus makes it possible to adjust the final volume of cups for the last passage of the hopper above the cups, for the next moulding operation.

Thus, depending on whether the remaining quantity is greater or smaller than the set value, the volume of the moulding cups is increased or reduced.

Thus the volume of the moulding cups is adjusted according to the special characteristics of the curds-serum mixture, so that a more or less important serum-curds mixture is tipped from the moulding cups into the moulds so as to obtain cheeses having the same weight, after draining in the moulds.

According to another embodiment of the invention, the moulding device for the application of the method according to the invention includes a vessel for containing a mixture of curds and serum, and a series of moulding cups.

According to the invention, the device comprises a distribution trough in which the vessel flows, a hopper including a row of openings located above the series of moulding cups and located at the distribution trough outlet, and motion means designed for moving the hopper and the series of moulding cups one relatively to the other.

Further features and advantages of the invention will be evident from the following description:

In the accompanying drawings which must be considered as non restricting examples:

Figure 1:
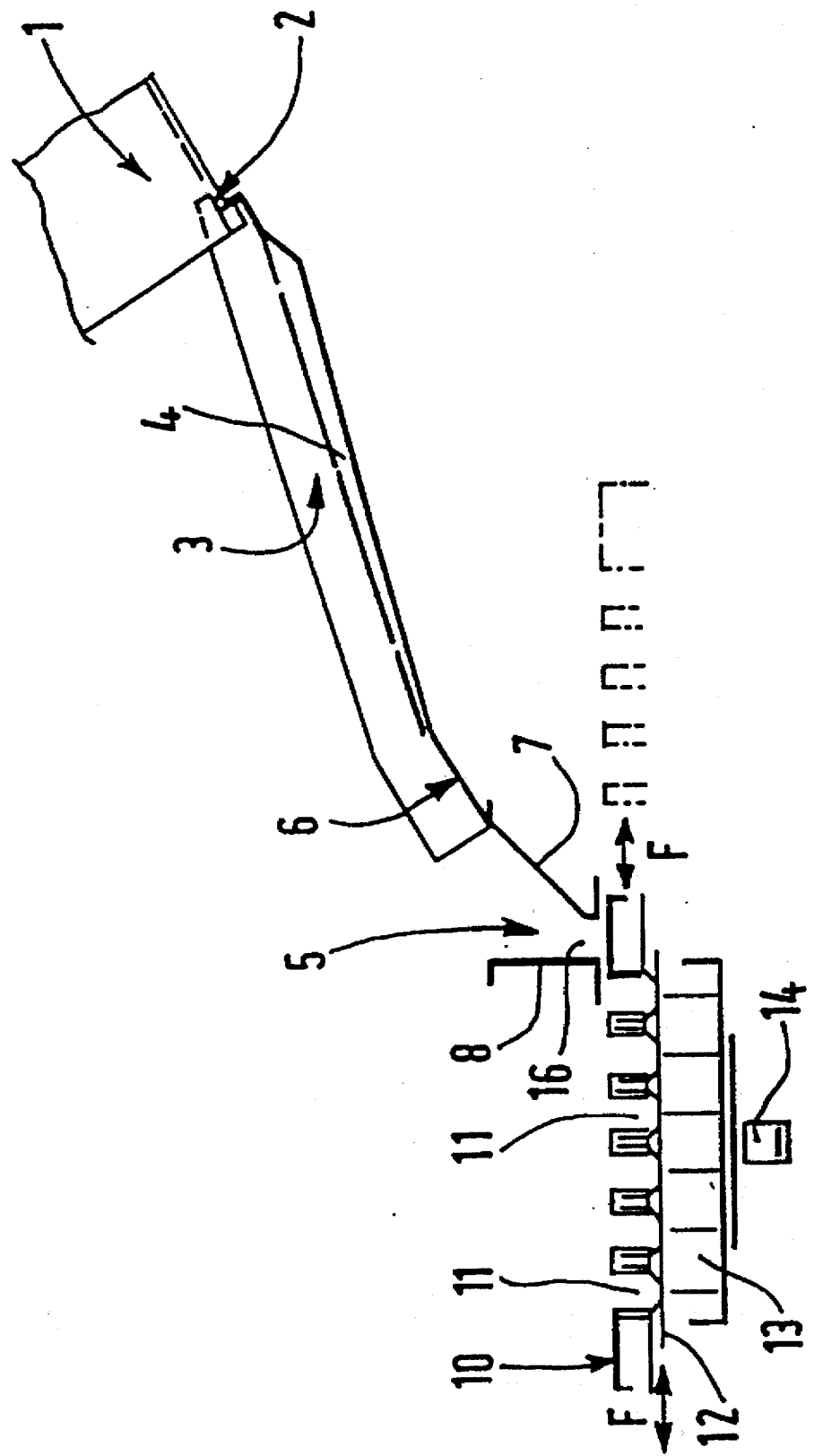
FIG. 1 is a front view of the device according to the invention.
Figure 2:
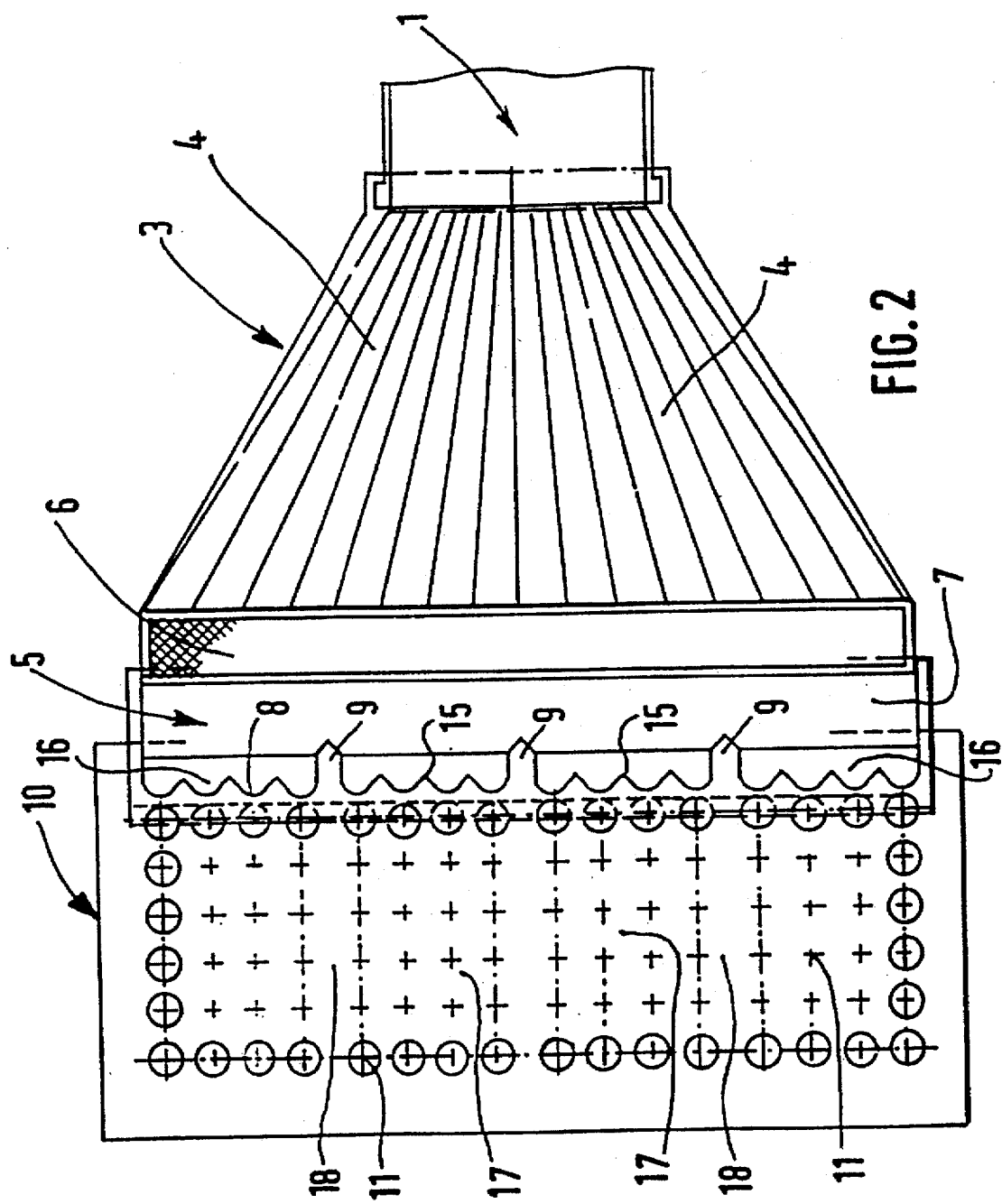
FIG. 2 is a top view of the device according to the invention.

The cheese moulding device according to the invention is shown in an exemplary embodiment in FIGS. 1 and 2.

It comprises a vessel 1 for containing a mixture of curds and serum. Such vessel 1 is typically a pan or a bowl.

This pan 1 flows into a distribution trough 3, thanks to a revolving motion around axis 2 which makes it possible to tilt the pan and to unload its contents into the distribution trough 3.

Such distribution trough is a sloping trough 3, the bottom of which has a corrugated surface defining grooves 4 which diverge from the width of the pan 1 to the width of the hopper 5. Such grooves 4 substantially extend parallel to the sloping direction of the trough 3.

The curds-serum mixture is thus uniformly distributed into grooves 4 of the trough and is gravity fed along the slope of the trough 3.

The curds-serum mixture is thus moved towards the moulding cups 11 which are located side by side in a plane, and form a rectangle.

The trough 3 has an outlet, i.e. a lower end, the width of which is substantially equal to the length of one side of said rectangle perpendicular to the direction of motion F of the hopper 5 and of the series of cups 11, one relatively to the other.

Thus, at the outlet of trough 3, the serum-curds mixture is uniformly distributed along one of the directions of the rectangle formed by the cups.

Preferably, serum-removing means is located on the path of the serum-curds mixture.

In the exemplary embodiment, the device comprises serum-removing means composed of a sloping plane 6 disposed at the outlet of the trough, the sloping plane being permeable to serum.

Such sloping plane 6 forms an angle of 30° with the horizontal plane whereas the trough has a slope of 15° as compared to the horizontal plane.

Such serum-removing sloping plane 6 makes it possible to remove a part of the serum contained in the mixture.

It is located upstream from a hopper 5 and opens into the lower end thereof.

Such hopper 5 includes a row of openings 16 located above the series of cups 11.

Such hopper 5 includes a wall 7, substantially sloping at 45° relatively to a horizontal plane, and provided for receiving the serum-curds mixture after its passage in the trough 3 and the serum-removing means 6.

As shown in FIG. 2, the hopper 5 comprises, at the level of its openings 16, profiled teeth extending parallel to the direction of motion F of the hopper 5 and of the series of cups 11 one relatively to the other and to the inside of the hopper 5.

Such profiled teeth are disposed at the level of openings 16 of the hopper, on face 8, opposite to wall 7, inclined at 45°, of the hopper 5 and are substantially located at right angles with the gaps 17 between two contiguous cups 11.

Such profiled teeth 15 make it possible to canalise the serum-curds mixture towards the cups so as to prevent the accumulation of curds on gaps 17 separating cups from one another.

In this exemplary embodiment, the series of moulding cups 11 consists of 4 groups of 24 cups, each group of 24 cups corresponding to a group of 24 moulds.

Such groups of 24 moulds are separated from one another so that gaps 18, without moulding cups 11, separate the various groups of moulding cups.

Thus the openings 16 of hopper 5 are separated by means of shutter teeth 9 located at right angles with gaps 18 without moulding cups 11.

The shutter teeth 9 extend vertically along one third of the height of the hopper 5 and prevent the serum-curds mixture from being distributed into the gaps 18 without cups.

Cups 11 are cylinders, the height of which can be adjusted so that their volume is adjusted. They have a retractable bottom 12 so that the mixture of curds and serum can flow from cups 11 into moulds 13 located under the cups.

Cups 11 are either tight, or permeable to serum.

To set the volume of the cups, such cups consist of two cylinders which can slide one into the other so as to set the height of the cups and thus their volume.

The cheese moulding method, according to the invention will now be described with reference to the device described hereabove.

The cheese moulding method according to the invention comprises the following steps:

a) pouring of the mixture of curds and serum into the trough 3 from pan 1;

b) filling of the hopper 5 with the serum-curds mixture; and c) moving of the hopper 5 and of the series of cups 11 one relatively to the other with a reciprocating motion;

d) increasing of the volume of cups by predetermined values, between each reciprocating motion during step c).

The motion of hopper 5 and of the series of cups 11 one relatively to the other is a reciprocating motion, which makes it possible to fill the cups 11 in several passages.

In the exemplary embodiment shown, the hopper 5 is steady and the series of cups 11 is subject to a reciprocating motion under the hopper 5 along the direction shown by arrow F. The ultimate locations of cups 11 during their reciprocating motion are shown in full lines and in dot-and-dash lines.

The motion velocity and the amount of reciprocating motions of the hopper 5 and of the series of cups 11 one relatively to the other are predetermined.

The relative velocity of the hopper relatively to cups 11 is of the order of 0.2 m per second. Experience showed that four passages of cups 11 under the hopper 5 made it possible to obtain a satisfactory filling of such cups.

The method according to the invention further comprises a serum-removing step, prior to step b), thanks to the passage of the serum-curds mixture on the sloping plane 6.

The method according to the invention further comprises the following steps:

e) positioning, prior to the completion of step c) of a series of moulds 13 substantially under the series of cups 11; and f) filling of moulds 13, after step c), with the mixture of curds and serum contained in the series of moulding cups 11.

The moulds 13 are brought thanks to a conventional conveyor under the position in which the cups will be stopped after step c). Then, when the cups are full and steady, an elevator 14 lifts up all the moulds 13 and positions them under the cups bottom 12.

Then each mould 13 is respectively disposed under a moulding cup 11.

The bottom 12 is then retracted so that the serum-curds mixture is gravity fed into the moulds 13 from cups 11.

The bottom 12 is open-worked, so that solid parts shut the cups in one position of bottom 12 and the open-worked parts are simultaneously disposed under the cups when the bottom 12 slides to another position.

The moulds 13 are then conveyed towards the next production steps comprising the draining, the maturing, as is known.

During step c), the filling of the hopper 5 is continuously carried out and is stopped during the execution of step c), preferably during the one but last passage of the hopper 5 above the cups.

Thus, during the whole duration of step c), the hopper 5 contains a certain quantity of mixture.

This makes it possible to have a complete filling of cups, after each motion of the hopper above the cups 11 and thus to obtain cups containing the same quantity of serum-curds mixture and a similar proportion of curds to the serum, in each cup. Upon completion of step c), the value of the quantity of mixture contained in hopper 5 is compared to a set value, the volume reached by the moulding cups 11 upon completion of step c) being adjusted according to the comparative value obtained for the next application of the method.

Thus, it being known that the pan capacity must correspond to the filling of a certain number of moulds 13, equal to 96, in the present exemplary embodiment, the volume of cups 11 is increased or reduced depending on the fact that the quantity of serum-curds mixture remaining in the hopper is higher or lower than the set value.

The volume of moulding cups 11 can also be adjusted according to the value of the weight of serum collected during steps a) through f) of the method and to the value of the weight of moulds 13 filled after step f).

It must be understood that the invention is not limited to the exemplary embodiment described hereabove and that numerous modifications can be brought thereto without going beyond the frame of the invention Thus the serum-removing means 6 can be composed of a cylinder, for example.

The hopper 5 can also includes profiled teeth 15 on wall 7 inclined at 45°, opposite the profiled teeth 15 located on the vertical wall 8 of the hopper.

The number of 24-cup 11 groups can vary from 2 to 6.

All the cups 11 can remain steady, the hopper 5, the trough 3 and the pan 1 being moved above the cups 11.

The moulds 13 can be filled from cups 11 in a different way, thanks, for example, to a series of pipes, each extending from the retractable bottom 12 of a cup 11 up to one associated mould 13.

The volume of cups 11 can be unmodified during step c) but only adjusted between each new application of the method according to the invention.

I claim:

1. A device for molding cheese comprising:

a vessel containing a mixture of curds and serum;

a distribution trough for receiving said mixture from said vessel and distributing said mixture into grooves;

a hopper upstream said distribution trough including a row of openings and disposed at an outlet of said distribution trough for receiving said mixture after passing said distribution trough, said hopper further comprising at a level of said openings, profile teeth for directing said mixture toward a plurality of molding cups;

a plurality of molding cups located below said hopper for receiving said mixture, said plurality of molding cups having a width substantially equal to that of said trough and said hopper; and motion means for moving said hopper and said plurality of molding cups in a horizontal direction relative to each other and to the inside of the hopper to fill said plurality of molding cups with a substantially same amount of said mixture.

2. A device according to claim 1, wherein said profile teeth (15) are substantially disposed at right angles with gaps (17) separating two contiguous cups (11).

3. A device for molding cheese comprising:

a vessel containing a mixture of curds and serum;

a distribution trough for receiving said mixture from said vessel and distributing said mixture into grooves;

a hopper upstream said distribution trough including a row of openings and disposed at an outlet of said distribution trough for receiving said mixture after passing said distribution trough, said hopper further comprises shutter teeth separating said opening and preventing said mixture being distributed in spaces devoid of molding cups;

a plurality of molding cups located below said hopper for receiving said mixture, said plurality of molding cups having a width substantially equal to that of said trough and said hopper; and motion means for moving said hopper and said plurality of molding cups in a horizontal direction relative to each other and to the inside of the hopper to fill said plurality of molding cups with a substantially same amount of said mixture.

4. A device for molding cheese comprising:

a vessel containing a mixture of curds and serum;

a distribution trough for receiving said mixture from said vessel and distributing said mixture into grooves;

a hopper upstream said distribution trough including a row of openings and disposed at an outlet of said distribution trough for receiving said mixture after passing said distribution trough, said hopper further comprising at a level of said openings, profile teeth for directing said mixture toward a plurality of molding cups and;

a plurality of molding cups comprising height adjustable cylinders, located below said hopper for receiving said mixture, said plurality of molding cups having a width substantially equal to that of said trough and said hopper, and shutter teeth separating said opening and preventing said mixture being distributed in spaces devoid of molding cups;

motion means for moving said hopper and said plurality of molding cups in a horizontal direction relative to each other and to the inside of the hopper to fill said plurality of molding cups with a substantially same amount of said mixture.

* * * * *